Figure 2:
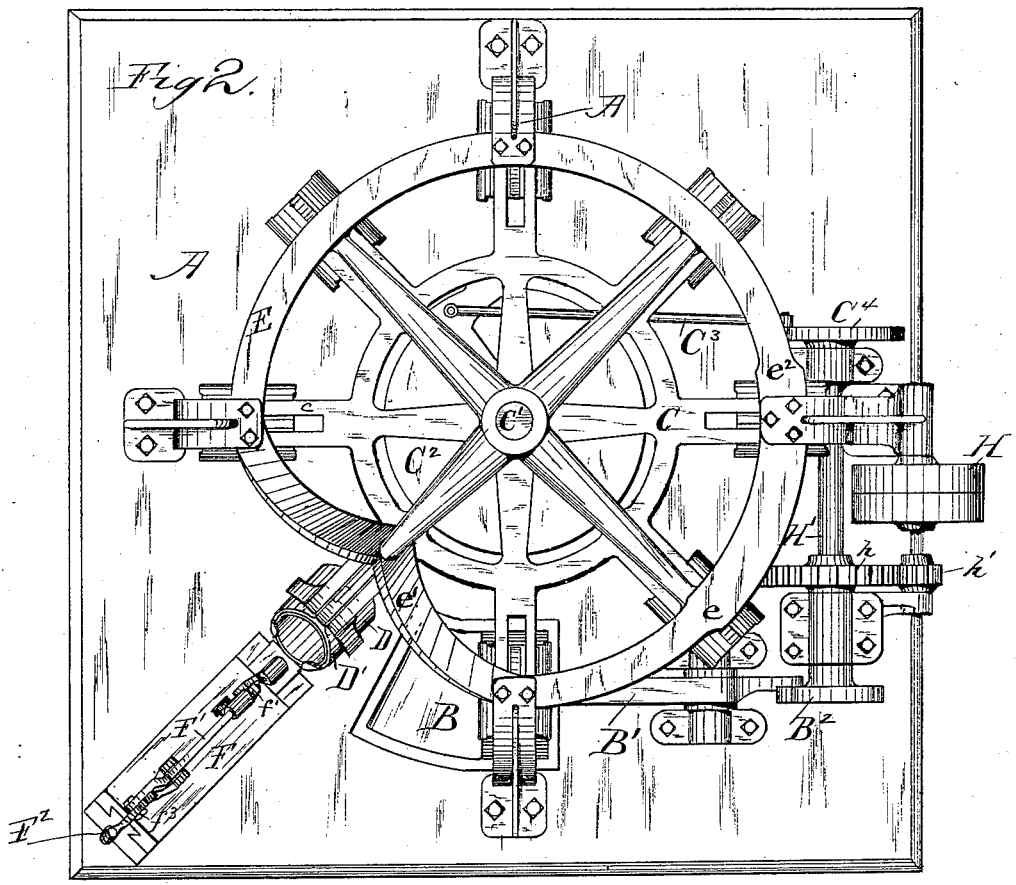

(No Model.) 2 Sheets—Sheet 1.
E. NORTON & J. G. HODGSON.
SOLDERING MACHINE.
No. 307,135. Patented Oct. 28, 1884.
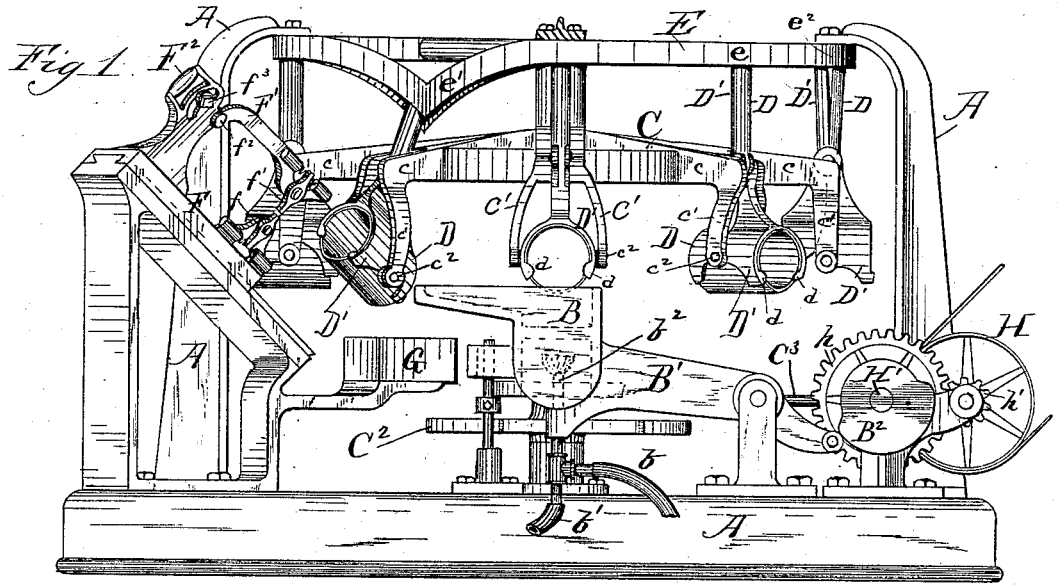
Fig. 1.
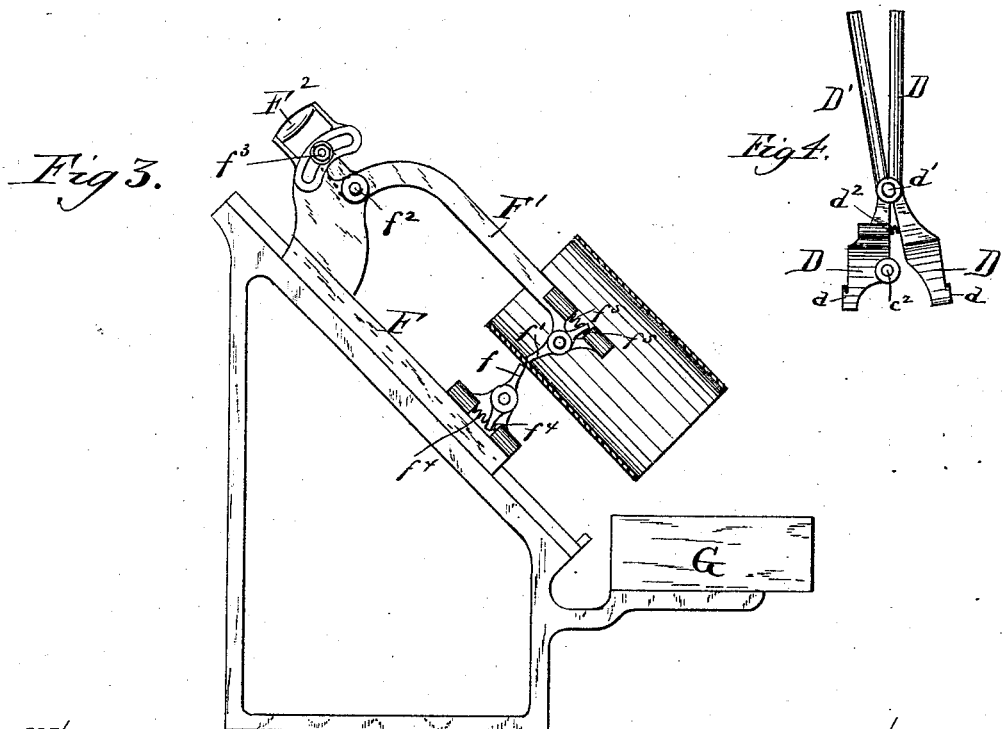
Fig. 3.
Fig. 4.
Witnesses:
Geo. E. Curtis.
Taylor E. Brown
Inventors:
Edwin Norton
John G. Hodgson
By Munday, Evarts & Adcock
Their Attorneys.
N. PETERS, Photo-Lithographer, Washington, D. C.

(No Model.) 2 Sheets—Sheet 2.

E. NORTON & J. G. HODGSON.
SOLDERING MACHINE.

No. 307,135. Patented Oct. 28, 1884.

Witnesses:
Lew. E. Curtis
Taylor E. Brown

Inventors:
Edwin Norton
John G. Hodgson
By Munday, Evarts & Adcock
Their Attorneys

UNITED STATES PATENT OFFICE.

EDWIN NORTON AND JOHN G. HODGSON, OF CHICAGO, ILLINOIS, ASSIGNORS TO SAID EDWIN NORTON AND OLIVER W. NORTON, OF SAME PLACE.

SOLDERING-MACHINE.

SPECIFICATION forming part of Letters Patent No. 307,135, dated October 28, 1884.

Application filed July 5, 1884. (No model.)

*To all whom it may concern:*

Be it known that we, EDWIN NORTON and JOHN G. HODGSON, citizens of the United States, residing in Chicago, in the county of Cook and State of Illinois, have invented a new and useful Improvement in Soldering-Machines, of which the following is a specification.

This invention relates to machines for soldering the side seams of sheet-metal cans.

The principle and mode of operation of the machine we have invented are as follows: The seam is soldered by dipping or immersing it in a bath of molten solder, the can being held in a movable clamp or holder, by means of which it is brought over the bath of solder and dipped therein. The can clamp or holder operates to present the can in a horizontal position to the bath, so that only the seam of the can need come in contact with the molten solder; but after the seam has been thus dipped the can clamp or holder is inclined so as to permit the surplus solder to run off or out of the can. The movable can holder or clamp next presents the can in this inclined position to a reciprocating wiper, which wipes the seam both inside and out, and operates to remove any surplus solder therefrom. A drip box or pan is provided to receive the surplus solder removed from the can by the wiper. The movable can-holder clamps may preferably be mounted on a revolving wheel or on radial arms, but other than a revolving carrier may be employed. To bring the seam in contact with the solder we mount the solder bath on a vertically-vibrating arm or holder and lift it into contact with the seam when the can is presented over the bath. Our invention may, however, be embodied in working form or reduced to practice by employing a fixed instead of a movable solder bath and depressing the can holders or clamps in turn as they are brought over the bath, so as to bring the seam into contact with the solder.

Another feature of our invention consists in a can-holder clamp having a pair of pivoted jaws and operating the same to clamp the can by means of a cam, which also serves to turn or incline the can-holder when the same is presented to the reciprocating wiper.

Another feature of the invention consists in a wiper having a spring-pivoted wiper-arm.

The invention also consists in the novel devices and novel combinations of devices herein shown, described, and claimed.

Figure 5:
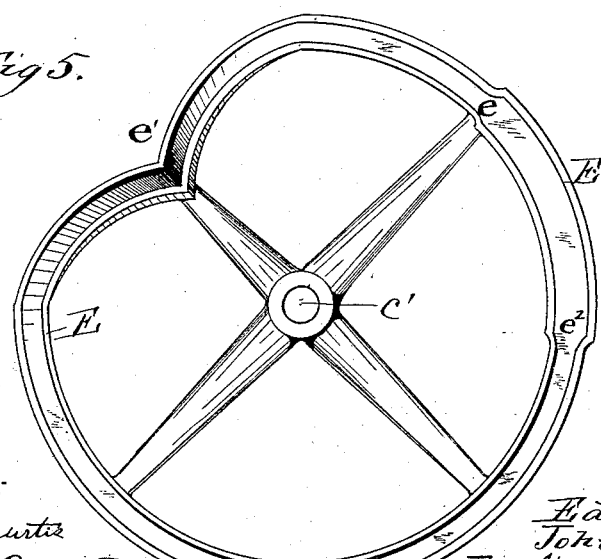

In the accompanying drawings, which form a part of this specification, and in which similar letters of reference indicate like parts throughout the several figures, Figure 1 is a side elevation of a machine embodying our invention and which we believe represents the best way we have contemplated of reducing it to practice. Fig. 2 is a plan view of the same. Fig. 3 is an enlarged detail view of the reciprocating wiper and its spring wiper-arms. Fig. 4 is a detail view of the can clamp or holder, and Fig. 5 is a bottom view of the cam which operates the can clamp or holder.

In said drawings, A represents the frame of the machine; B, the solder bath, and C an intermittently-revolving wheel or hub having arms or projections $c\ c'$, between or on which the can holders or clamps are pivoted by the pins $c^2$. The can holders or clamps in the machine shown in the drawings consist of a pair of jaws, D D', conforming in shape to the body of the can, and provided with lips or projections $d$, to fit over the ends of the can, and thus clamp the same. The lips or projections $d$ serve as stops to hold the can in position while being subjected to the action of the reciprocating wipers and to prevent the same being slipped out of the holder. As the sides of the holder-jaws D D' are curved and conform to the shape of the can, they afford a support for the sides of the can to preserve its shape while the same is being subjected to the action of the wipers. These arms or jaws D D' are pivoted together at $d'$, and are furnished with a spring, $d^2$, which operates to open the jaws and release the can therefrom. The arm or jaw D is mounted pivotally on the radially-projecting arms $c\ c'$ of the intermittently-revolving wheel C, so that the can-holder may be turned into an inclined position for the purpose of causing the solder to drain out of the can. The upper ends of the clamp arms or jaws D D' fit in a stationary grooved cam, E, which operates to close the jaws upon the can as the wheel C revolves, and hold the same so closed while the can is presented to the solder bath and to the wiper. This cam also serves to turn or incline the can-holder on its pivot $c^2$ as soon as the can leaves the solder bath and to hold the same stationary in its inclined position while the seam is being wiped. When the arms D D' reach the part of the cam marked $e$, the same operates to close the holder upon the can. When the arms D D' reach the downwardly and inwardly curved portions of the cam marked $e'$ the same operates to turn the can-holder on its pivot into an inclined position. When the arms D D' reach the part of the cam marked $e^2$, the same permits the spring $d^2$ to open the jaws and discharge the can. The circular portion of the cam is directly above the pin $c^2$, which pivots the holder D to the intermittently-revolving wheel or the projections $c\ c'$ thereon, so that the can, when it is brought over the solder bath, is by the cam held in a horizontal position.

F is a reciprocating slide, upon which the wipers are mounted, and by which they are operated. The wiper-arm $f$, which operates upon the outside of the seam, is pivoted directly to this slide or to a projection thereon. The inside wiper-arm, $f'$, is pivoted to an arm, F', adjustably connected to the slide F by the pin $f^2$ and set-screw or bolt $f^3$. Springs $f^4 f^5$ serve to press the operating ends of the wiper-arms $f f'$, which should be furnished with asbestus or other suitable wiping material against the seam.

$F^2$ is a handle for operating the slide. It may, however, be operated automatically by connecting it with a suitable cam-wheel, or by other equivalent means. In operation the wipers should be pushed entirely through the can and then drawn back. By so doing the pivoted wipers will on the reverse movement turn or incline in the opposite direction to that shown in Fig. 3, which shows their position when making the downward movement.

G is a drip-pan for receiving the surplus solder removed from the can by the wipers. The solder bath B is movable, being mounted on the pivoted arm or frame B', which is intermittently raised and lowered by the cam $B^2$, for the purpose of bringing the molten solder in contact with the seam when the can-holder is brought over the bath by the intermittent revolution of the wheel C. The solder may preferably be melted and kept in a molten condition by a gas-flame, and for this purpose $b$ represents a gas-pipe, $b'$ an air-pipe, and $b^2$ a burner. These pipes should have flexible connections to permit of the vertical movement of the solder bath. The revolving wheel C is secured to a shaft, C', which is journaled in suitable bearings on the frame of the machine.

Any suitable mechanism may be employed to communicate to the wheel C an intermittently-revolving motion; but we preferably employ a swinging arm pivoted or journaled on the shaft C', carrying a spring-pawl, which engages with a ratchet-wheel on the shaft C', and a chuck-wheel, $C^2$, having notches which engage a locking-bolt or slide to hold the same stationary. As this mechanism for intermittently revolving and locking the wheel is fully shown and described in our former patent, No. 274,363, granted March 20, 1883, for can-ending machines, we do not deem it necessary to show or describe the same here in detail, but would refer to said former patent for a more full description of the same.

$C^3$ is the pitman-rod for communicating this intermittent motion to the wheel C, or, rather, to the ratchet-wheel on the shaft C'.

H represents the driving-pulleys. The shaft on which the pulley H is mounted communicates motion to the shaft H', on which is the cam $B^2$ and the crank or wrist pin wheel $C^4$, that communicates motion to the pitman-rod $C^3$, by means of the gears $h\ h'$.

The cans may be fluxed before being placed in the holders, or the machine may be furnished with a flux or acid bath similar to the solder bath B, in which the seam is dipped preparatory to being immersed in the solder bath.

It will of course be understood that the can is so placed in the holder that its seam is down.

As the can-bodies of course have no heads when placed in their holders, and can therefore be readily partially collapsed or sprung into elliptical form in cross-section, they can be placed in the holders, though the same be made rigid and have no movable jaws, and our invention is not limited to the use of can-holders having movable jaws. We deem it, however, preferable to employ can-holders with pivoted jaws, as the opening of the jaws not only facilitates the placing of the can-bodies in the holders, but also the discharging of the cans therefrom. The can-holder jaws may, if preferred, be made open in a direction at right angles to that in which those shown in the drawings open.

While one feature of our invention consists in the pivoted wiper-arms, our invention is, however, not confined to the use of wipers of this particular construction.

The lips or projections $d$, for the ends of the can to fit against, may consist of a mere shoulder formed on the end of the can-holder, as, for instance, by countersinking the body or central portion of the can-holder, in which the can-body rests.

We claim—

1. In a side-seam-soldering machine, the combination of a solder bath with a series of can holders or clamps pivoted to intermittently-moving arms, and means for turning the can holders on their pivots as the cans issue from the bath to allow the solder to drain therefrom, substantially as specified.

2. The combination of a solder bath, a movable can holder or clamp, and a reciprocating wiper to remove the surplus solder from the seam, and mechanism for moving said can-holder to present the can first to the bath and then to the wiper, substantially as specified.

3. The combination of a solder bath with a can holder or clamp pivoted to an intermittently-moving carrier-arm, and an inclined reciprocating wiper to remove the surplus solder from the seam, substantially as specified.

4. The combination, with a solder bath, of an intermittently-moving can holder or clamp and a reciprocating wiper-slide provided with wipers for wiping the seam both inside and out, substantially as specified.

5. The combination of a vertically-movable solder bath with an intermittently-revolving horizontal wheel, C, provided with arms $c\ c'$, can-holder clamp D D', pivoted to said arms $c\ c'$, and a cam, E, and reciprocating wiper-slide F, provided with wipers for wiping the seam both inside and out, substantially as specified.

6. The combination, with a device for holding the can in an inclined position, of an inclined reciprocating wiper provided with wipers for wiping the seam inside and out, substantially as specified.

7. The combination, with a device for holding the can, of a reciprocating wiper-slide provided with a pivoted spring wiper-arm, substantially as specified.

8. The combination, with a device for holding the can, of a reciprocating wiper-slide, provided with pivoted spring wiper-arms for wiping the seam on both the inside and outside the can, substantially as specified.

9. The combination, with a device for holding the can, of a reciprocating slide, F, furnished with adjustable arm F', and provided with pivoted spring wiper-arms $f f'$, substantially as specified.

10. The combination of the vertically-movable solder bath with an intermittently-revolving horizontal wheel C, provided with arms $c\ c'$, can-holder clamp-arms D D', pivoted together, and provided with lips $d$, to grasp against the end of the can, and with a spring, $d^3$, to open the same, said clamp-arm D being pivoted to the arms $c\ c'$, and a cam, E, to operate said clamp-arms D D', and to incline the same, substantially as specified.

11. The combination of intermittently-revolving horizontal wheel C, provided with projections or arms, a can-holder pivoted to said projections or arms, a solder-bath, and a cam serving to turn and hold said pivoted can-holder, so that the can will be presented in a horizontal position to the solder-bath and turned into an inclined position as it leaves the same, substantially as specified.

12. In a machine for soldering side seams of sheet-metal cans, the combination, with a solder bath, of a movable can-holder clamp engaging against the ends of the can, and conforming in shape to the can, substantially as specified.

13. The combination, with a can-holder conforming in shape to the body of the can, and provided with lips or projections to fit over the ends of the can, of a reciprocating wiper to remove the surplus solder from the seam of the can, substantially as specified.

14. The combination, with a can-holder conforming to the can-body in shape, and having shoulders or projections for the ends of the can to fit against, of a reciprocating wiper for wiping the seam of the can on the inside, substantially as specified.

15. In a machine for soldering side seams of can-bodies by immersion in a solder bath, a clamp or mold to grasp the can-body and present its seam to the action of the solder bath, said clamp conforming to the can-body so as to press against the same and cause it to resist the subsequent action of the wipers, in combination with a solder bath, and a wiper or device for removing the surplus solder from the can-body arranged to bear against the seam while the can-body is held in the clamp, substantially as described.

16. In a machine for soldering side seams of can-bodies by immersion in a solder bath, one or more clamps or molds pivotally attached to one or more carriers, so that they may be caused to assume an inclined position after leaving the solder bath, said clamps pressing against the can-body so as to hold it in place while the seam is being soldered and subsequently wiped, in combination with a solder bath, and a wiper or device for removing surplus solder arranged to bear against the can-body while it is held in the clamp, substantially as specified.

EDWIN NORTON.
JOHN G. HODGSON.

Witnesses:
H. M. MUNDAY,
TAYLOR E. BROWN.